B. C. MATHES.
CASTER WHEEL.
APPLICATION FILED JUNE 8, 1909.
932,624.
Patented Aug. 31, 1909.
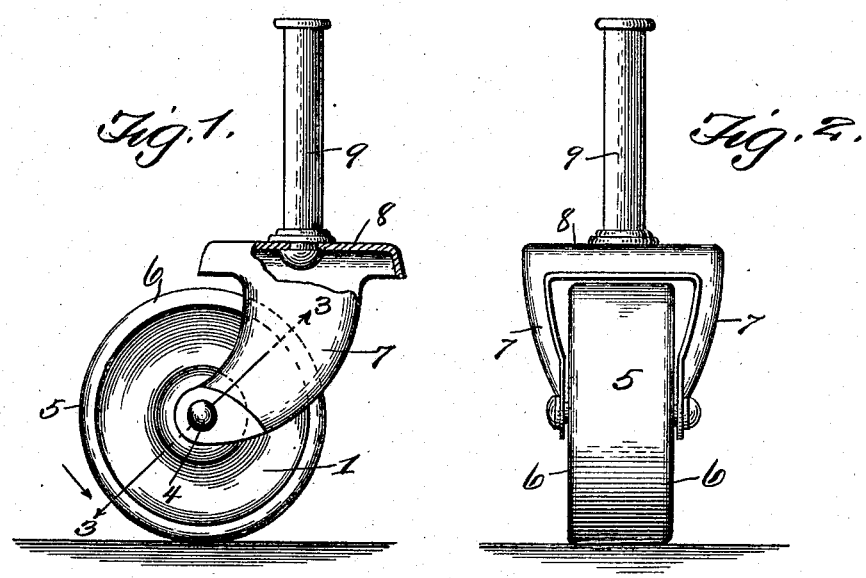
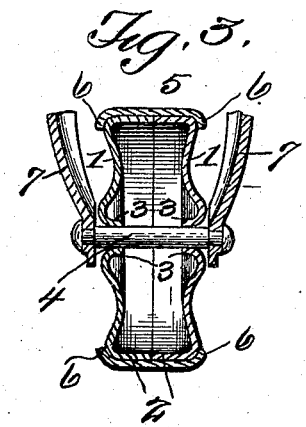
Witnesses
Inventor
Benjamin C. Mathes,
By C. B. Whitmore,
Attorney

UNITED STATES PATENT OFFICE.

BENJAMIN C. MATHES, OF ROCHESTER, NEW YORK.

CASTER-WHEEL.

932,624.     Specification of Letters Patent.     Patented Aug. 31, 1909.

Application filed June 8, 1909. Serial No. 500,919.

*To all whom it may concern:*

Be it known that I, BENJAMIN C. MATHES, of Rochester, in the county of Monroe and State of New York, have invented a new and useful Improvement in Caster-Wheels, which improvement is fully set forth in the following specification and shown in the accompanying drawings.

This invention relates to certain new and useful improvements in caster wheels and it has for its objects among others to provide a simple and cheap, yet strong and efficient wheel formed in sections of sheet metal stamped or pressed into shape by means of dies and forms and held in place by the member constituting the band or tire of the wheel, which latter is independent of the sections of the body of the wheel.

Other objects and advantages of the invention will hereinafter appear and the novel features thereof will be particularly pointed out in the appended claim.

The invention is clearly illustrated in the accompanying drawings, which, with the numerals of reference marked thereon, form a part of this specification, and in which—

Figure 1 is a side elevation of a caster provided with my improved wheel. Fig. 2 is a view at right angles to Fig. 1. Fig. 3 is an axial section of the wheel taken on the line 3—3 of Fig. 1, looking in the direction of the arrow.

Like numerals of reference indicate like parts in the several views.

Referring to the drawings, and more particularly to Fig. 3, the construction of the wheel will be clearly understood. It is formed of two similarly cup-shaped parts 1, 1, turned edge to edge with the lateral or flange portions 2, 2 abutting. These parts or sides 1, 1 are, by preference, given a curved form, as seen clearly in Fig. 3, both for the purpose of stiffening them and to give them a more ornamental appearance. They are made of sheet metal and may be stamped or pressed into shape by means of suitable dies and forms, or otherwise given the desired shape. At their centers they are formed with openings, and the edges 3, 3 of these openings are turned inward, as seen clearly in Fig. 3, for receiving the pin 4 which serves as the axis upon which the wheel turns.

5 is a band or tire of metal surrounding the periphery of the two parts 1, 1 and has its edges spun downward and inwardly, as seen at 6, to partially inclose the parts or sides 1, 1 and firmly hold the same in position in a maner which will be apparent from Figs. 1 and 3.

A wheel thus formed can be conveniently and cheaply constructed, is light, yet strong and durable, and, in practice, has proven to be very efficient.

The pin or axle 4 is held in the jaws or side portions of the yoke, from the base 8 of which rises the splindle 9 of any approved form.

What is claimed as new is:—

In a caster, a wheel formed of cup shaped parts with a central opening, and a band in a single piece independent of said parts and surrounding the same and holding them together, said parts being of curved form with their adjacent edges abutting and with the edges at the center opening turned inwardly to form a bearing for and against the axis of the wheel.

In witness whereof, I have hereunto set my hand this 15th day of February, 1909, in the presence of two subscribing witnesses.

BENJAMIN C. MATHES.

Witnesses:
    E. B. WHITMORE,
    A. M. WHITMORE.